Patented Sept. 14, 1926.

1,600,143

UNITED STATES PATENT OFFICE.

DANIEL L. SHERK, OF DE QUINCY, LOUISIANA.

PROCESS OF IMPROVING STEAM-DISTILLED WOOD TURPENTINE.

No Drawing. Application filed June 16, 1923. Serial No. 645,908.

The present invention relates to a process of improving "steam distilled wood turpentines," whereby this material can be rendered sufficiently pure and free from injurious effects, to be used as a substitute for ordinary spirits of turpentine (gum turpentine) in most of the applications of the latter.

In order to make myself perfectly clear in regard to the materials treated herein, I may state that there are three well known substances which are in some respects similar and in other respects entirely different.

These are (a) gum turpentine. This material is made from the gum product obtained by scarring long leaf pine trees, and collecting the exudations.

(b) "Steam distilled wood turpentine." This material is made from light-wood or fat wood, namely, stumps of long leaf pine trees, as well as other wood, such as broken down trees and the like, which are considerably impregnated with resinous material. In the ordinary process of operation, the lightwood is first hogged, then put into a digester and steam is run through to vaporize the terpenes and some other constituents, the steam and vapors being subsequently condensed and the aqueous material separated, leaving an oily material which has been distilled from the wood by means of the steam.

(c) "Destructively distilled wood turpentine." This material is a product made by external heating of a retort containing chips or other pieces of lightwood. Destructively distilled wood turpentine contains constituents obtained by direct heating before the oils have finally been driven off at such a temperature that the rosin remaining in the wood, and the wood itself, begin to decompose, furnishing products which contaminate the oil. In this process the temperature of the charge is carefully watched, and when the temperature reaches some particular predetermined figure (varying more or less in different plants) the vapors are passed into a separate condenser (or a cut is made in some other manner), whereby the condensate produced in the later stages is kept separate from that produced in the earlier stages. The condensate produced in the earlier stages constitutes the destructively distilled wood turpentine.

Steam distilled wood turpentines cannot be used for many of the uses of gum turpentine, on account of what is ordinarily termed their "odor," although this term does not accurately describe the real objection to steam distilled turpentine. Chemically considered, the three turpentines are all rather complex, all consisting largely of terpenes (largely pinene) and they are different from each other in their minor constituents (minor as regards actual proportions). Steam distilled wood turpentines are suitable for use in paints, or varnishes to some extent, as where the paints or varnishes are to be used out of doors, or in well ventilated spaces. Steam distilled wood turpentines are however, not suitable for the manufacture of varnishes or paints for use in inside rooms, or for coating the interior of cars or the like.

The chief objection to the use of steam distilled wood turpentine for this purpose is that it produces great irritation of the mucous membranes, such as the nose and throat, irritation of the eyes, headaches, and the like, and possesses an objectionable "pungency." Where attempts have been made to commercially use steam distilled wood turpentine, for varnish making, unsatisfactory results have been produced, principally on account of this irritation and injury to the health of the workmen as above referred to.

Destructively distilled wood turpentine, is not generally used alone, as a substitute for gum turpentine. It is to some extent used mixed with large quantities of naphtha, as a turpentine substitute, and is satisfactory for use as such under some conditions, for example, for out of door painting. On account of its very disagreeable odor and extreme pungency, it is not used in paints for interior work.

As above stated the present invention relates to the treatment of the second mentioned of these materials, namely, steam distilled wood turpentine. The object of the invention is to take away from this product, its property of producing irritation of the mucous membranes, irritation of the eyes, headaches and similar troubles so that the steam distilled wood turpentine, after treatment can be used for making paints and varnishes for interior work, yielding products which will be entirely free from the objectionable effects experienced in its use in the past.

In accordance with the present process the steam distilled wood turpentine is subjected to treatment with strong alkalies for the removal of those constituents which are believed to be responsible for the objections to this material. Steam distilled wood turpentine, like gum turpentine, consists largely of terpenes, and terpene derivatives. Steam distilled wood turpentines contain about 6 to 15% or so of dipentene which is not found to any substantial extent in gum turpentine. This material has a smell somewhat different from that of gum turpentine, but is not in any way injurious for the ordinary uses of turpentine.

Ordinary gum turpentine contains certain aldehydes and esters in small amounts, which give this product its characteristic fragrant flowery smell.

Steam distilled wood turpentine contains a number of aldehydes and ketones, which are not present as normal constituents in gum turpentine, and it is believed that these substances are largely responsible for the irritating quality of the steam distilled wood turpentine. Among these substances acrolein is ordinarily present in steam distilled wood turpentine but is not present in gum turpentine. This material constitutes about 1% or less of the entire steam distilled product. Various other aldehydes and ketones are present in much smaller amounts, in the steam distilled product, and these are also believed to be to a considerable extent responsible for the irritating quality of the steam distilled product. Both the gum turpentine and the steam distilled wood turpentine contain small quantities of acetic acid and similar organic acids rendering the product slightly acid in its normal condition. The acidity of both turpentines tends to increase more or less during storage of the product.

In accordance with the present process, the steam distilled wood turpentine is treated with a caustic alkali solution which is capable of polymerizing and removing the substances causing the irritation above referred to, and capable of removing the objectionable pungency. As examples of the alkalies, I mention caustic soda as being the most important from the commercial standpoint. Caustic potash can likewise be used. Calcium hydroxid (milk of lime) or milk of baryta, can be used, although they do not work so well as the caustic soda. The caustic alkalies are preferably used in the form of aqueous solutions. A solution of caustic soda of 20% strength has been found to give very satisfactory results, although solutions of this material of a lower strength or of a much higher strength can be used. Solutions from 10% strength up to saturation can be used. The aqueous solutions are preferable, but the alcoholic solutions also can be used, e. g., a 10 to 20% solution of NaOH in denatured or grain alcohol.

In the preferred form of my process, I add to the steam distilled wood turpentine, about 5% of actual NaOH in the form of an aqueous solution, the solution preferably being of about 20% strength. The solution is preferably well agitated in order to produce good contact of the turpentine and alkali solution, and the mixture is also preferably heated in order to accelerate the reaction. The temperature used can vary between wide limits, but I find that the temperature of about 100 to 115° C., continued for a period of one to two hours (or until the irritating effect has disappeared) together with violent agitation throughout such treatment gives very satisfactory results. For the lower temperatures recommended, around 100° C., violent mechanical agitation is necessary throughout the treatment, or excessively long periods of heating are required. In ordinary operation, the temperature can be maintained slightly above the boiling point of the caustic soda solution used, the soda solution used thereby securing the necessary agitation to effect the mixing by ebullition of the alkali solution. The digesting treatment can preferably be carried out in receptacles provided with reflux condensers, in order to prevent extensive loss of turpentine during the treatment. In some cases closed tanks in which the digestion is effected under superatmospheric pressure will be found satisfactory, thereby preventing loss of turpentine by evaporation during the process.

I have above referred to a temperature of 100 to 115° C. This temperature however, can be varied within wide limits, and it is even possible that the operation could be conducted at room temperature, but a very long period of time would be required.

In place of using the solution of caustic alkali, it would be possible to use solid caustic alkali or solid lime or soda lime or baryta. However, the results when treating with the solutions seem to be more complete and preferable. During this operation, the aldehydes and ketones and other substances in the steam distilled wood turpentine which cause the objectionable irritation above referred to, are to a great extent polymerized into resinous matters and these materials precipitate out from the turpentine. The turpentine after being treated as above described, can then be separated from the alkaline solution, and can then be redistilled. In ordinary practice, however, I find that the entire mixture after the digesting operation can be run into the stills and distilled in the presence of the alkali. The distillation may be carried out directly, using heat sufficient to boil the turpentine; or the turpentine may be fractionally distilled, but preferably distillation may be carried out with steam in precisely the same manner as the oils originally obtained from the wood are now separated into their valuable constituents.

When using an alcoholic solution of caustic alkalies, the process is conducted by adding the alcoholic solution to the turpentine, mixing, and heating, for example in a closed boiler, or receptacle having a reflux condenser. The alcohol can subsequently be distilled off for reuse, and the turpentine distilled. When using alcoholic solutions of caustic soda of about 20% of strength (miscible with turpentine in the cold), or alcoholic caustic potash solutions of about 20% strength (miscible in the hot), treatment is carried out preferably at the boiling point of the alcohol in apparatus fitted with a reflux condenser.

Heretofore steam distilled wood turpentines have not generally been subjected to any purification whatever, other than perhaps redistillation, with steam if desired. The process of the present case is applicable either to the raw crude turpentine, namely, the oils as derived directly from the wood, or to the more refined product produced by redistillation thereof.

The product will be found to have a smell very much resembling the smell of the ordinary steam distilled wood turpentine, but this smell has been very much weakened during the process. Its pungency is considerably reduced. The distillate is found to differ also from the ordinary steam distilled turpentine in being free from the slight acidity of the latter. However, acidity may develop in this turpentine, on long standing. This absence of acidity, or relatively low acidity after storage for a reasonable time, is of importance in the storage and shipment in iron or galvanized iron drums, or the like.

The product obtained by my present process meets every requirement applied to steam distilled wood turpentine, as for instance 90% distilling below 170° C. A test by which the product of my process may be distinguished from ordinary steam distilled wood turpentines, is that the ordinary turpentines when treated with solid caustic alkali and heated for a time, give a precipitation of resinous material, or a brown coat forms on the particles of solid alkali under the condition of test. Whereas, the constituents of the turpentine which produce these resinous products, having already been substantially completely removed from my product during the treatment to purify the same; my product will give no reaction or at most only a faint yellow color indicating the presence of only a slight amount of material resinified by this test. Any steam distilled wood turpentine distilling 80% or more below 170° C., which gives no reaction or only a slight reaction with the above test is substantially my product. Any turpentine which has aged to the extent that only 80% will distill below 170° C., undergoes changes resulting in the conversion of pinene and admitting of oxidation with formation of aldehydes, begins to give a reaction with the above alkali test, which reaction if slight and showing only traces of the constituents which produce the resinous products, show this to be substantially my product.

I use the term "smell" in the present case, rather than the term "odor", because in the trade the term "odor" as applied to this turpentine has heretofore been generally associated with the irritating effects above referred to, which are absent in my product.

The product of the present process can be used as a substitute for gum turpentine, for practically all of the uses of the latter. Thus it may be used directly in the mixing or thinning of paints for inside work, and may be directly used in the manufacture of varnishes and lacquers.

I claim:

1. A process of treating steam distilled wood turpentine for improving the same without previously overheating the same to a substantial extent, which comprises contacting the steam distilled wood turpentine, for a protracted period, with an alkali, until resinification of the readily polymerizable constituents has been effected, and thereafter subjecting the so treated turpentine to distillation, whereby a product is secured which is largely free from the irritating effect of the original turpentine.

2. A process of treating steam distilled wood turpentine for improving the same without previously overheating the same to substantial extent, which comprises contacting the same while in a heated state, with fixed caustic alkali solution, until resinification of the readily polymerizable constituents is effected, whereby a product is secured which is largely free from the irritating effect of the original turpentine.

3. In the process of claim 1, the step of treating the steam distilled wood turpentine with a solution of an alkali.

4. A process of treating steam distilled wood turpentine, which comprises contacting the said turpentine, while at a temperature of about 100 to 115° C., with a solution of caustic soda, of about 20% strength, the alkali being in excess, until resinification of the readily polymerizable constituents of the wood turpentine is substantially effected, and thereafter subjecting the so treated turpentine to distillation, whereby a product is secured which is largely free from the irritating effect of the original turpentine.

DANIEL L. SHERK.